(12) United States Patent
Heider et al.

(10) Patent No.: US 12,209,634 B2
(45) Date of Patent: Jan. 28, 2025

(54) MODULAR ATTACHMENT DEVICE FOR INSERTION INTO A PLURALITY OF STRANDS OF A BRAIDED ROPE

(71) Applicant: AIRBUS HELICOPTERS DEUTSCHLAND GMBH, Donauworth (DE)

(72) Inventors: Christoph Heider, Rain am Lech (DE); Alexandru Dinca, Donauworth (DE); Dominik Vogel, Langweid (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 295 days.

(21) Appl. No.: 17/722,516

(22) Filed: Apr. 18, 2022

(65) Prior Publication Data
US 2023/0026372 A1 Jan. 26, 2023

(30) Foreign Application Priority Data
Jul. 26, 2021 (EP) .................................... 21400017

(51) Int. Cl.
*F16G 11/12* (2006.01)
*D07B 1/14* (2006.01)

(52) U.S. Cl.
CPC ................ *F16G 11/12* (2013.01); *D07B 1/14* (2013.01); *D07B 2501/2092* (2013.01)

(58) Field of Classification Search
CPC .......... F16G 11/12; F16G 11/14; D07B 1/14; D07B 2501/2092
See application file for complete search history.

(56) References Cited

U.S. PATENT DOCUMENTS 1,408,940 A 3/1922 Harley
1,920,970 A * 8/1933 Chevalier ............. F16G 11/048
24/115 R (Continued)

FOREIGN PATENT DOCUMENTS

CN 205114816 U 3/2016
CN 112047228 A 12/2020
(Continued)

OTHER PUBLICATIONS

European Search Report for European Application No. EP 21400017. 6, Completed by the European Patent Office, Dated Jan. 24, 2022, 6 pages.

*Primary Examiner* — Lee D Wilson
(74) *Attorney, Agent, or Firm* — BROOKS KUSHMAN P.C.

(57) ABSTRACT

A modular attachment device for insertion into a plurality of strands of a braided rope, comprising: at least one braiding segment that is braidable into the plurality of strands; at least one first lateral fixation segment that is mountable to the at least one braiding segment at a first lateral attachment interface; and at least one second lateral fixation segment that is mountable to the at least one braiding segment at a second lateral attachment interface, wherein at least one of the first and second lateral fixation segments comprises at least one anchor point for attachment of an external component, and wherein the first and second lateral fixation segments are mountable to the at least one braiding segment for securing the plurality of strands on the at least one braiding segment.

20 Claims, 6 Drawing Sheets

(56) References Cited

U.S. PATENT DOCUMENTS

| | | | | | |
|---|---|---|---|---|---|
| 2,193,236 | A | * | 3/1940 | Meighan | F16G 11/046 24/129 R |
| 5,728,099 | A | * | 3/1998 | Tellman | A61B 17/746 606/65 |
| 8,091,866 | B2 | * | 1/2012 | White | H02G 1/081 254/134.3 FT |
| 11,357,555 | B2 | * | 6/2022 | Lin | A61B 17/8023 |
| 2004/0034972 | A1 | * | 2/2004 | Brown | F16G 11/046 24/129 R |
| 2005/0061905 | A1 | * | 3/2005 | Sherman | F16G 11/14 242/388.2 |
| 2010/0228291 | A1 | * | 9/2010 | Butler | A61B 17/8023 606/259 |
| 2011/0173780 | A1 | | 7/2011 | Lipke | |
| 2021/0267653 | A1 | * | 9/2021 | Destainville | A61B 17/8023 |
| 2021/0267654 | A1 | * | 9/2021 | Destainville | A61B 17/8052 |
| 2021/0386458 | A1 | * | 12/2021 | Villamil | A61B 17/809 |
| 2022/0409247 | A1 | * | 12/2022 | Tyber | A61B 17/808 |
| 2023/0026372 | A1 | * | 1/2023 | Heider | F16G 11/14 |
| 2023/0118599 | A1 | * | 4/2023 | Petersen | F16G 11/046 24/115 R |
| 2023/0225769 | A1 | * | 7/2023 | James | A61B 17/7059 606/289 |

FOREIGN PATENT DOCUMENTS

| | | |
|---|---|---|
| EP | 3037133 B1 | 6/2016 |
| GB | 2340101 B | 2/2002 |
| WO | 2020068603 A1 | 4/2020 |

\* cited by examiner

MODULAR ATTACHMENT DEVICE FOR INSERTION INTO A PLURALITY OF STRANDS OF A BRAIDED ROPE

CROSS-REFERENCE TO RELATED APPLICATIONS

This application claims priority to European patent application No. EP 201400017.6 filed on Jul. 26, 2021, the disclosure of which is incorporated in its entirety by reference herein.

TECHNICAL FIELD

The present disclosure is related to a modular attachment device for insertion into a plurality of strands of a braided rope. The present disclosure is further related to a Special Patrol Insertion/Extraction (SPIE) rig that comprises a braided rope with such a modular attachment device.

BACKGROUND

In general, ropes with attachment devices are known from the state-of-the-art. In these ropes the attachment devices usually form anchor points for attachment of human or non-human cargo. By way of example, the documents CN 112 047 228 A, CN 205 114 816 U, EP 3 037 133 B1, GB 2 340 101 B, and U.S. Pat. No. 1,408,940 A describe illustrative ropes with attachment devices that form anchor points. The document US2011173780 was cited.

In civil, parapublic and military missions, such ropes may embody SPIE rigs that may e.g., be used with a rotary wing aircraft, in particular a helicopter, for rapidly inserting and/or extracting persons and/or cargo from various environments, in particular environments that do not permit landing of the helicopter. Such environments may e.g., include maritime environments such as offshore as well as oil and gas platforms, and terrestrial environments such as land in vegetated areas, mountains and urban territory.

More specifically, a SPIE rig may comprise a braided rope with a plurality of strands, into which a plurality of attachment devices is inserted. Each attachment device may be formed as a so-called "rig plate" that is inserted into and, more particularly, braided into the plurality of strands during braiding of the braided rope. Each rig plate may have one or more anchor points for attachment of human or non-human cargo.

However, if a rig plate of a given SPIE rig is damaged and must be exchanged, the braided rope must be opened, i.e., unbraided, at least from one of its ends up to the damaged rig plate. Similarly, if e.g., an additional rig plate is to be inserted at a predetermined position in the braided rope, then the braided rope must be opened, i.e., unbraided, at least from one of its ends up to the predetermined position. In both cases, this involves time-consuming and cost-intensive manual work.

The document WO 2020/068603 A1 describes a method for installing an attachment device at any desired position of a given braided rope that comprises a plurality of strands. According to this method, the given braided rope is opened at a desired position, i.e., the plurality of strands is loosened and separated along the midline of the braided rope at the desired position to form a hole into which a sleeve is inserted. The sleeve is then secured and hold in position in the braided rope by means of an outer case which is mounted to the braided rope at the desired position. However, the sleeve is merely inserted into the plurality of strands, but not braided thereinto.

SUMMARY

It is an object of the present disclosure to provide a new attachment device for insertion into a plurality of strands of a braided rope, which may easily and securely be braided into the plurality of strands and form a high strength, robust and low-wear load introduction point into the braided rope.

This object is solved by a modular attachment device that comprises the features of claim 1. More specifically, according to the present disclosure a modular attachment device for insertion into a plurality of strands of a braided rope is provided. The modular attachment device comprises at least one braiding segment that is braidable into the plurality of strands, at least one first lateral fixation segment that is mountable to the at least one braiding segment at a first lateral attachment interface, and at least one second lateral fixation segment that is mountable to the at least one braiding segment at a second lateral attachment interface. The first and second lateral fixation segments are mountable to the at least one braiding segment for securing the plurality of strands on the at least one braiding segment. At least one of the first and second lateral fixation segments comprises at least one anchor point for attachment of an external component.

Advantageously, the inventive attachment device is modular in that it comprises at least three separate base components: the at least one braiding segment, the at least one first lateral fixation segment, and the at least one second lateral fixation segment. These separate base components are preferably attached to each other at an associated position in the braided rope to enable use of the respective anchor points at the associated position. Preferably, the first and second lateral fixation segments are respectively attached to each other by means of suitable securing members.

The separate base components may comprise different materials which may be selected in order to optimize an underlying functionality and/or specific characteristics. For instance, the at least one braiding segment may be optimized with respect to its weight, e.g., to be as lightweight as possible and/or to enable high strength at respective braiding recesses. Accordingly, the at least one braiding segment may be made of fiber reinforced material. The at least one first and second lateral fixation segments, in turn, may be optimized with respect to damage tolerance and/or to exhibit high tolerance for lateral loads. By way of example, the at least one first and second lateral fixation segments may comprise metal.

More specifically, due to their modularity the modular attachment device may be inserted at any desired position into a previously braided rope without unbraiding the entire rope or a part of the rope from one of its ends up to the desired position. Consequently, the braided rope may initially be braided completely and after braiding the modular attachment device can be inserted at the desired position. Likewise, a given modular attachment device may be removed from an associated position in a braided rope without unbraiding the entire rope or a part of the rope from one of its ends up to the associated position. Thus, time-consuming and cost-intensive manual work for unbraiding and re-braiding may be avoided.

As a result, respective modular attachment devices may be added to a given braided rope or replaced in the given braided rope at any time with negligible effort. Furthermore, the respective modular attachment devices may be moved from respectively associated positions to other desired positions in the braided rope with negligible effort.

Advantageously, the at least one braiding segment may easily be replaced, in particular with comparatively low costs. For instance, the at least one braiding segment may be replaced if it is damaged or it may simply be replaced with a newly designed braiding segment that e.g., comprises one or more additional braiding recesses.

Similarly, one or both lateral fixation segments may easily be replaced, in particular with comparatively low costs. For instance, a lateral fixation segment may be replaced if it is damaged or it may simply be replaced with a newly designed lateral fixation segment that e.g., comprises one or more additional anchor points and/or a modified outer contour.

Moreover, the inventive attachment device advantageously exhibits a stable design. More specifically, tension loads are preferably introduced into the securing members which attach the first and second lateral fixation segments to each other, while moments are e.g., introduced into a tongue and groove joint that connects the first and second lateral fixation segments to an associated braiding segment. The tongue and groove joint may be replaced by any suitable form-lock or form-fit connection.

According to one aspect, the at least one braiding segment comprises a plurality of recesses for accommodation of associated pairs of strands of the plurality of strands.

According to one aspect, the recesses of the plurality of recesses are at least approximately C-shaped.

According to one aspect, the at least one first lateral fixation segment and/or the at least one second lateral fixation segment comprises a plurality of recesses that are configured to form with the plurality of recesses of the at least one braiding segment a plurality of strand eyelets, after mounting of the at least one first lateral fixation segment and/or the at least one second lateral fixation segment to the at least one braiding segment.

According to one aspect, the recesses of the plurality of recesses of the at least one first lateral fixation segment and/or the at least one second lateral fixation segment are at least approximately C-shaped.

According to one aspect, at least one of the first and second lateral attachment interfaces is embodied as a tongue and groove joint.

According to one aspect, the at least one braiding segment comprises at least one groove, wherein at least one of the first and second lateral fixation segments comprises at least one tongue that is adapted to engage with the at least one groove upon mounting of the at least one of the first and second lateral fixation segments to the at least one braiding segment.

According to one aspect, at least one of the first and second lateral fixation segments comprises at least one groove, wherein the at least one braiding segment comprises at least one tongue that is adapted to engage with the at least one groove upon mounting of the at least one of the first and second lateral fixation segments to the at least one braiding segment.

According to one aspect, the at least one first lateral fixation segment is adapted to be fixedly mounted to the at least one braiding segment at the first lateral attachment interface via associated fixation means.

According to one aspect, the at least one second lateral fixation segment is adapted to be fixedly mounted to the at least one braiding segment at the second lateral attachment interface via associated fixation means.

According to one aspect, the associated fixation means are screws, in particular self-locking screws.

According to one aspect, at least one of the first and second lateral fixation segments and/or the at least one braiding segment comprises at least one securing member accommodation for accommodating a securing member that is adapted to secure one of the associated fixation means after mounting of the at least one first lateral fixation segment and/or the at least one second lateral fixation segment to the at least one braiding segment.

According to one aspect, the securing member is a grub screw.

According to one aspect, the modular attachment device is embodied as a rig plate, wherein at least one of the first and second lateral fixation segments and/or the at least one braiding segment comprises metal.

The present disclosure further relates to a SPIE rig with a braided rope and at least one modular attachment device as described above.

Advantageously, any braided rope may easily be transformed into a SPIE rig due to the modularity of the inventive attachment device. The SPIE rig may easily be adapted to respective customer needs, e.g., with respect to underlying operation platforms.

More specifically, such a SPIE rig may be made of an uninterrupted braided rope with no splices and no sewing, and would be multi-redundant in-depth inspectable, in particular using non-destructive testing procedures. In such a SPIE rig the modularity of the inventive attachment device allows full inspection and a full, simple, economic, reliable exchange of all constituent components. Full inspection advantageously includes inspection at respective interfaces between the braided rope and the inventive attachment device.

Furthermore, in such a SPIE rig the main part of the inventive attachment device, i.e., essentially the whole braiding segment, is covered by the braided rope. Therefore, an underlying rope-characteristic regarding handling persists. Moreover, the load transfer from the attachment device to the braided rope works via a combination of friction and form-fit, as the braiding segment is braided into the braided rope. Due to the form-fit design, the attachment cannot release from the braided rope in case of overloading. Finally, as the braided rope may be provided with an attachment device that can be integrated into an already braided rope, the attachment device may have any almost freely selectable length and capacity and it can be inserted into the braided rope at any position.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
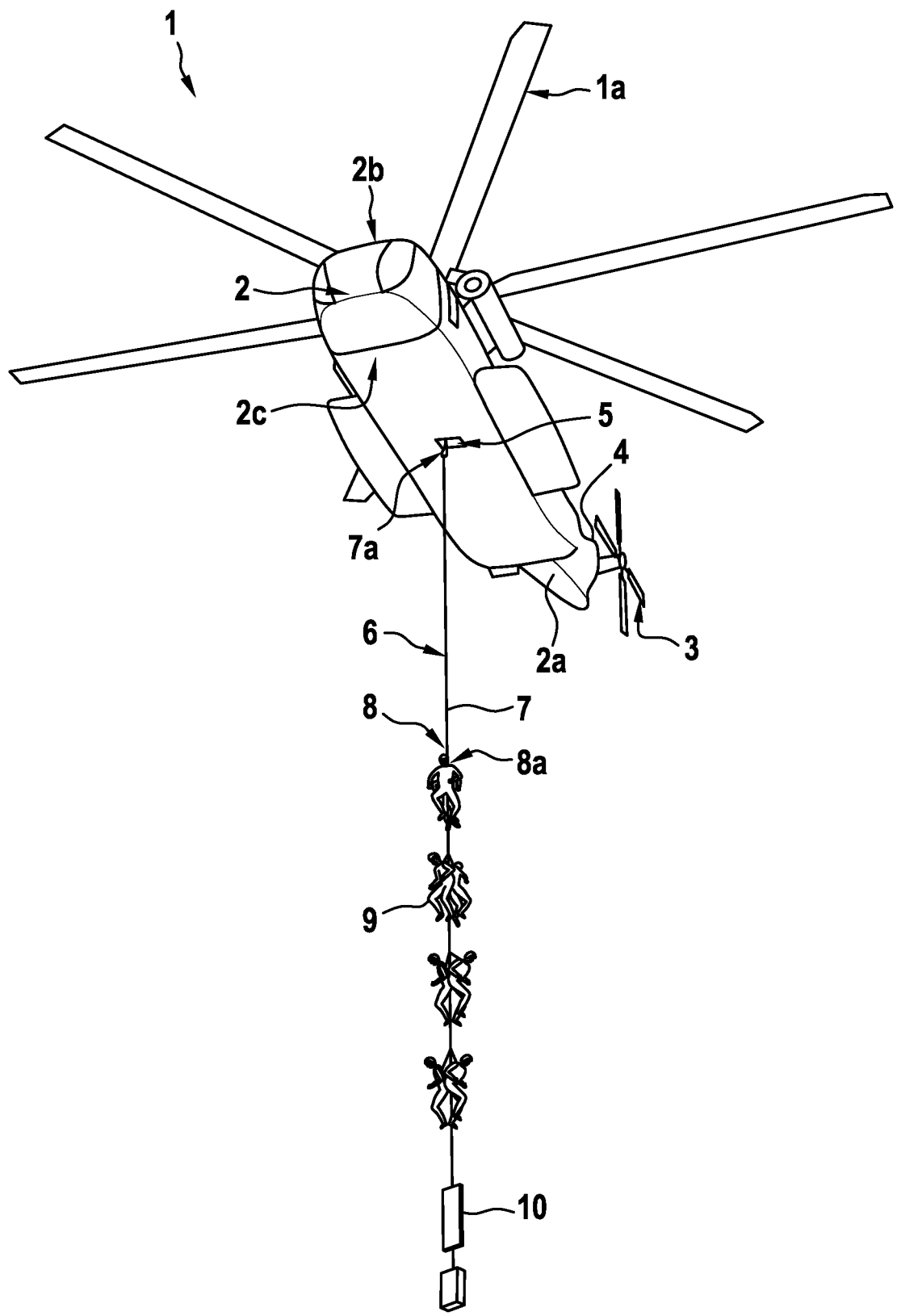
FIG. 1 shows a perspective view of a rotary wing aircraft with a SPIE rig according to one aspect.

FIG. 1 shows a rotary wing aircraft 1 that illustratively comprises a fuselage 2 with a bottom shell 2c. By way of example, the fuselage 2 forms a cabin 2b for passengers and/or cargo and a tail boom 2a is mounted to the fuselage 2.

The rotary wing aircraft 1 illustratively further comprises at least one main rotor 1a configured to provide lift and forward or backward thrust during operation, and at least one counter-torque device 3 configured to provide counter-torque during operation, i.e., to counter the torque created by rotation of the at least one main rotor 1a for purposes of balancing the rotary wing aircraft 1 in terms of yaw.

The at least one counter-torque device 3 is illustratively provided at an aft section of the tail boom 2a, which preferably further comprises a fin 4. However, it should be noted that the at least one counter-torque device 3, as well as the fin 4 provided at the aft section of the tail boom 2a, are merely described for illustrating one possible realization of the rotary wing aircraft 1.

According to one aspect, the rotary wing aircraft 1 is provided with a SPIE rig 6. By way of example, the SPIE rig 6 is attached to an associated attachment 5 provided at the bottom shell 2c. The attachment 5 is illustratively embodied as an attachment ring which may e.g., be connected to a cable that is coupled to a winch.

More specifically, the SPIE rig 6 preferably comprises a rope 7 with a rope interface 7a, such as an eyelet, which is illustratively attached to the attachment 5, e.g., by means of a snap hook respectively carabiner. The rope 7 is preferably provided with at least one attachment device 8a and, illustratively, with a plurality of attachment devices 8. The plurality of attachment devices 8 is preferably provided to enable attachment of external components such as human and/or non-human cargo thereto and, thus, to the rope 7. By way of example, a plurality of persons 9 and some cargo 10 are attached to the plurality of attachment devices 8. The SPIE rig 6 and/or its constituent components are further described below with reference to FIG. 2 to FIG. 6.

Illustratively, the rotary wing aircraft 1 with the SPIE rig 6 is shown in operation. In this illustrative operation, the SPIE rig 6 may e.g., be used for inserting or extracting the persons 9 and/or the cargo 10 into/from a respective environment.

By way of example, the rotary wing aircraft 1 is embodied as a helicopter. However, use of the SPIE rig 6 is not limited to use with a helicopter. Instead, the SPIE rig 6 may be used with other rotary wing aircrafts, such as e.g., tiltrotor aircrafts, compound helicopters, multicopters and so on. More generally, the SPIE rig 6 may be used completely independent of the rotary wing aircraft 1 for any possible rig and tackle applications, such as e.g., in sailing, climbing and so on.

Figure 2:
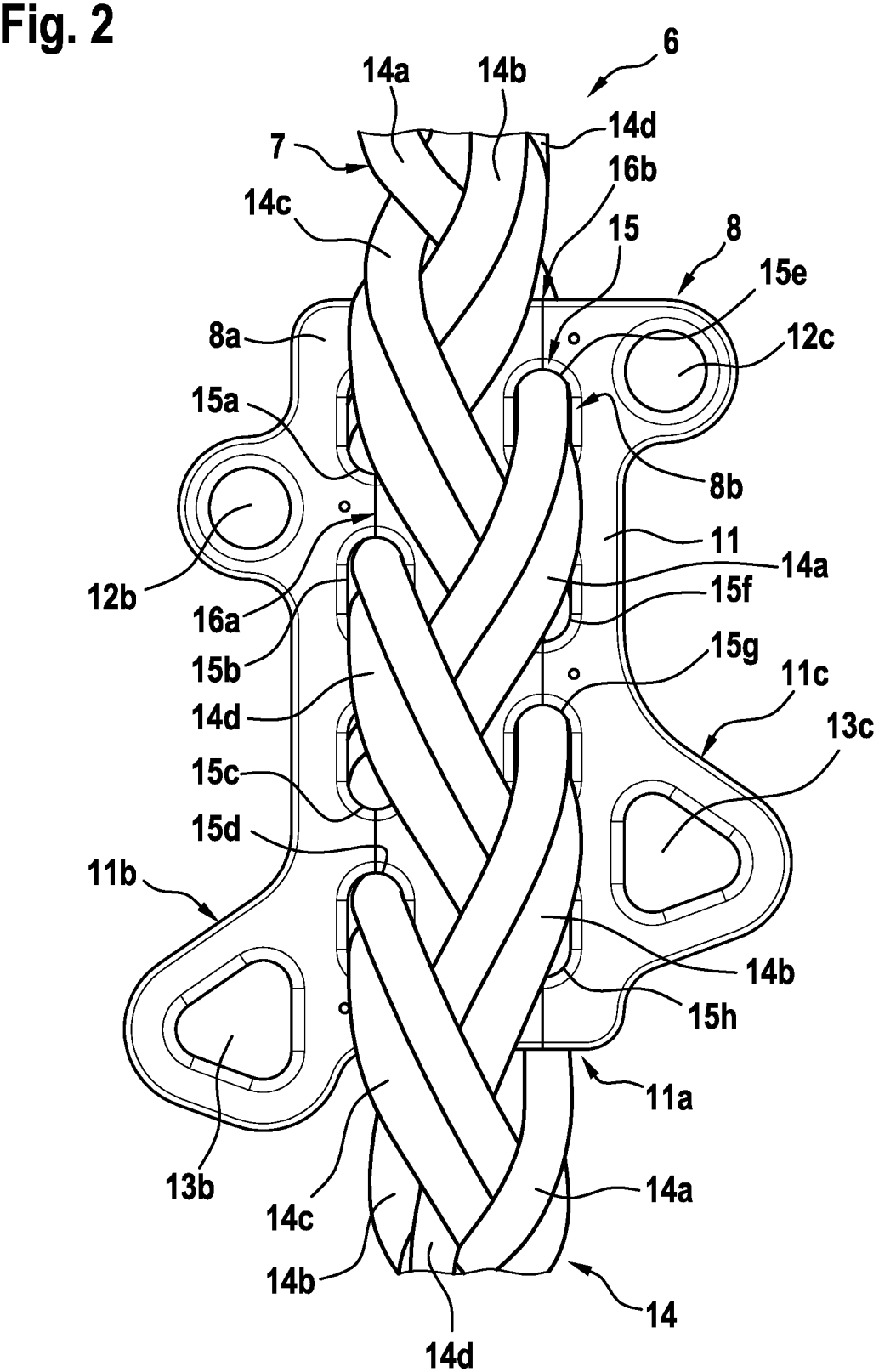
FIG. 2 shows a front view of an enlarged detail of the SPIE rig of FIG. 1 with a modular attachment device according to an embodiment.

FIG. 2 shows the attachment device 8a of the plurality of attachment devices 8 of FIG. 1 and, more particularly, a front side 8b of the attachment device 8a, with a section of the rope 7 of the SPIE rig 6 of FIG. 1. According to the present disclosure, the rope 7 is a braided rope that comprises a predetermined number of strands 14 which are braided together to form the braided rope 7. By way of example, the predetermined number is eight. Accordingly, the braided rope 7 comprises eight strands which illustratively form a first, a second, a third, and a fourth pair of strands 14a, 14b, 14c, 14d that are braided together.

The braided rope 7 is preferably connected to the attachment device 8a, which is illustratively inserted into the plurality of strands 14 of the braided rope 7. More specifically, the attachment device 8a is inserted into the four pairs of strands 14a, 14b, 14c, 14d.

The attachment device 8a is preferably plate-shaped, i.e., embodied as a plate-shaped element 11, which is hereinafter also referred to as the "rig plate 11", for simplicity and clarity. By way of example, and not for restricting the present disclosure accordingly, the attachment device 8a is hereinafter illustratively and representatively described with reference to the rig plate 11 only.

According to the present disclosure, the rig plate 11 is modular in that it comprises at least one braiding segment 11a, at least one first lateral fixation segment 11b, and at least one second lateral fixation segment 11c. At least one of the first and second lateral fixation segments 11b, 11c and/or the at least one braiding segment 11a may comprise metal.

By way of example, the at least one first lateral fixation segment 11b is shown on the left-hand side of the at least one braiding segment 11a and, therefore, referred to as the "left segment 11b" hereinafter, for simplicity and clarity. The at least one second lateral fixation segment 11c is shown on the right-hand side of the at least one braiding segment 11a and, therefore, referred to as the "right segment 11c" hereinafter, for simplicity and clarity.

At least one of the left and right segments 11b, 11c comprises at least one anchor point for attachment of an external component, such as one of the plurality of persons 9 and/or the cargo 10 of FIG. 1. Illustratively, the left segment 11b is provided with two anchor points 12b, 13b, and the right segment 11c is provided with two anchor points 12c, 13c.

The left segment 11b is mounted to the at least one braiding segment 11a at a first lateral attachment interface 16a, and the right segment 11c is mounted to the at least one braiding segment 11a at a second lateral attachment interface 16b. As the first lateral attachment interface 16a is illustratively arranged between the left segment 11b and the at least one braiding segment 11a, it is hereinafter referred to as the "left interface 16a", for brevity and simplicity. Similarly, as the second lateral attachment interface 16b is illustratively arranged between the right segment 11c and the at least one braiding segment 11a, it is hereinafter referred to as the "right interface 16b", for brevity and simplicity.

The at least one braiding segment 11a is inserted and, more particularly, braided into the plurality of strands 14. The left and right segments 11b, 11c are mounted to the at least one braiding segment 11a for securing the plurality of strands 14 on the at least one braiding segment 11a.

Illustratively, the plurality of strands 14 is braided into a plurality of associated strand eyelets 15 formed by the rig plate 11. By way of example, the plurality of strand eyelets comprises eight eyelets 15a, 15b, 15c, 15d, 15e, 15f, 15g, and 15h. The eyelets 15a, 15b, 15c, 15d are preferably formed, i.e., closed in circumferential direction, by attaching the left segment 11b to the at least one braiding segment 11a, and the eyelets 15e, 15f, 15g, 15h are preferably formed, i.e., closed in circumferential direction, by attaching the right segment 11b to the at least one braiding segment 11a, as described in more detail below at FIG. 4.

Insertion of the rig plate 11 into the plurality of strands 14 of the braided rope 7 may be performed as described by way of example hereinafter:

Initially, the plurality of strands 14 of the braided rope 7 is preferably loosened at a selected position of the braided rope 7, where the at least one braiding segment 11a is to be inserted into the braided rope 7. The loosening is preferably performed such that the pairs of strands 14a, 14b, 14c, 14d of the plurality of strands 14 may subsequently be manipulated separately.

Then, the at least one braiding segment 11a is inserted into the plurality of strands 14 at the selected position. As the left and right segments 11b, 11c are not attached to the at least one braiding segment 11a, the eight eyelets 15a, 15b, 15c, 15d, 15e, 15f, 15g, and 15h are laterally unclosed, i.e., in unclosed state.

Subsequently, the pair of strands 14b is inserted into the eyelet 15a coming from the front side 8b toward a back side and into the eyelet 15g coming from the back side toward the front side 8b. Then, the pair of strands 14c is inserted into the eyelet 15f coming from the front side 8b toward the back side and into the eyelet 15d coming from the back side toward the front side 8b. Furthermore, the pair of strands 14a is inserted into the eyelet 15e coming from the back side toward the front side 8b and into the eyelet 15c coming from the front side 8b toward the back side. Moreover, the pair of strands 14d is inserted into the eyelet 15b coming from the back side toward the front side 8b and into the eyelet 15h coming from the front side 8b toward the back side.

Finally, the left and right segments 11b, 11c are attached to the at least one braiding segment 11a for laterally closing the eight eyelets 15a, 15b, 15c, 15d, 15e, 15f, 15g, and 15h and, thus, fixing the pairs of strands 14a, 14b, 14c, 14d in the eight eyelets 15a, 15b, 15c, 15d, 15e, 15f, 15g, and 15h. Attachment of the left and right segments 11b, 11c to the at least one braiding segment 11a is described in more detail below at FIG. 5.

Figure 3:
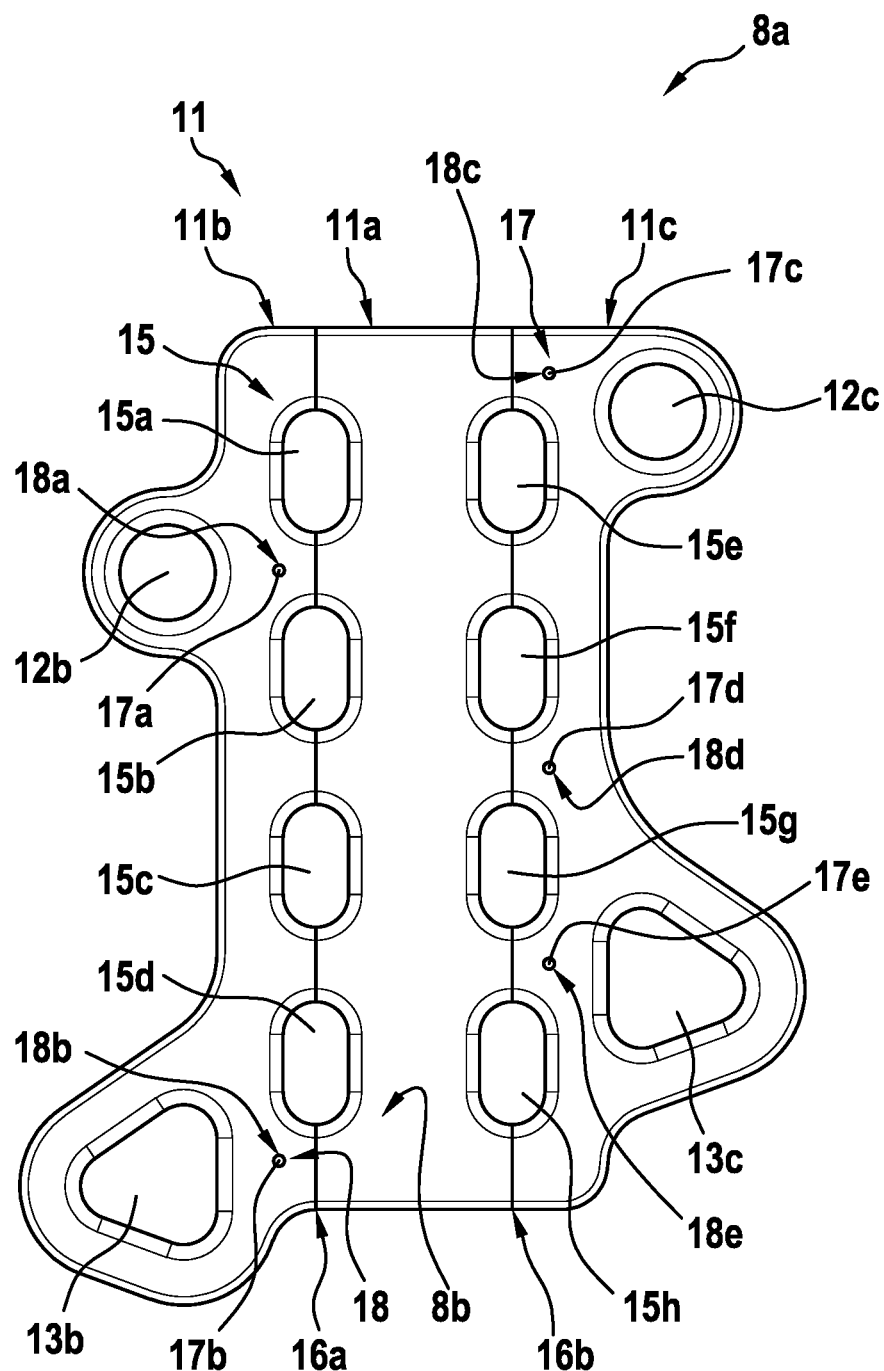
FIG. 3 shows a front view of the modular attachment device of FIG. 2 with a braiding segment and first and second lateral fixation segments.

FIG. 3 shows the modular attachment device 8a of FIG. 2, which is illustratively embodied as the rig plate 11 of FIG. 2 with the at least one braiding segment 11a, as well as the left and right segments 11b, 11c, which together form the plurality of eyelets 15. The left segment 11b comprises the anchor points 12b, 13b and is illustratively mounted to the at least one braiding segment 11a at the left interface 16a, and the right segment 11c comprises the anchor points 12c, 13c and is illustratively mounted to the at least one braiding segment 11a at the right interface 16b. Furthermore, the at least one braiding segment 11a and the left segment 11b form the eyelets 15a, 15b, 15c, 15d, and the at least one braiding segment 11a and the right segment 11c form the eyelets 15e, 15f, 15g, 15h.

Illustratively, the left and right segments 11b, 11c comprise a plurality of securing member accommodations 18. By way of example, the left segment 11b comprises two securing member accommodations 18a, 18b of the plurality of securing member accommodations 18, and the right segment 11c comprises three securing member accommodations 18c, 18d, 18e of the plurality of securing member accommodations 18.

The securing member accommodations 18a, 18b, 18c, 18d, 18e are provided to accommodate a plurality of securing members 17. More specifically, the securing member accommodations 18a, 18b, 18c, 18d, 18e are provided to accommodate associated securing members 17a, 17b, 17c, 17d, 17e of the plurality of securing members 17, as described in more detail below at FIG. 5 and FIG. 6.

Figure 4:
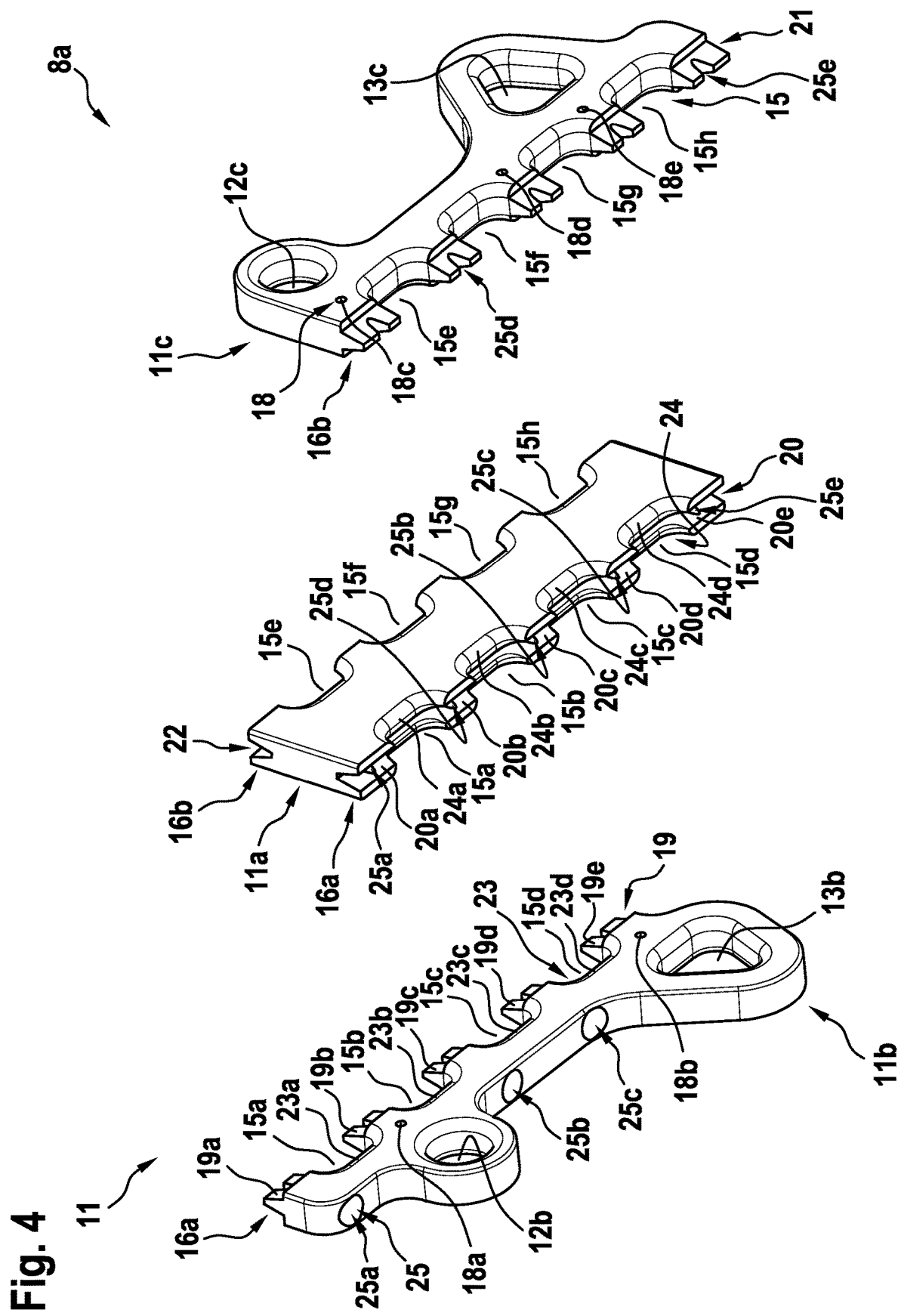
FIG. 4 shows an exploded perspective view of the modular attachment device of FIG. 3.

FIG. 4 shows the modular attachment device 8a of FIG. 2 and FIG. 3, which is illustratively embodied as the rig plate 11 of FIG. 2 and FIG. 3 with the at least one braiding segment 11a, as well as the left and right segments 11b, 11c, which together form the plurality of eyelets 15. More specifically, the at least one braiding segment 11a and the left segment 11b that comprises the anchor points 12b, 13b form in mounted state of the left segment 11b the eyelets 15a, 15b, 15c, 15d, and the at least one braiding segment 11a and the right segment 11c that comprises the anchor points 12c, 13c form in mounted state of the right segment 11c the eyelets 15e, 15f, 15g, 15h.

However, in contrast to FIG. 2 and FIG. 3 the left and right segments 11b, 11c, which are mountable to the at least one braiding segment 11a, are illustratively detached from the at least one braiding segment 11a to further illustrate the left and right interfaces 16a, 16b of FIG. 2 and FIG. 3. Moreover, the unclosed state of the eyelets 15a, 15b, 15c, 15d, 15e, 15f, 15g, 15h of the plurality of strand eyelets 15, as described in FIG. 2 above, is also further illustrated.

More specifically, at least one of the left and right interfaces 16a, 16b may be embodied as a tongue and groove joint. The tongue and groove joint is preferably provided to ensure a required tolerance compensation in lateral direction of the rig plate 11. Preferably, each one of the left and right interfaces 16a, 16b is embodied as a tongue and groove joint. However, instead of tongue and groove joints, any other suitable form-lock and/or form-fit joints are likewise contemplated.

For instance, the at least one braiding segment 11a may comprise at least one groove and at least one of the left and right segments 11b, 11c may comprise at least one tongue that is adapted to engage with the at least one groove upon mounting of the at least one of the left and right segments 11b, 11c to the at least one braiding segment 11a. Illustratively, the at least one braiding segment 11a comprises five grooves 20a, 20b, 20c, 20d, 20e which form a plurality of grooves 20, and the left segment 11b comprises five tongues 19a, 19b, 19c, 19d, 19e which form a plurality of tongues 19, wherein the plurality of tongues 19 is adapted to engage with the plurality of grooves 20 upon mounting of the left segment 11b to the at least one braiding segment 11a.

Similarly, the right segment 11c illustratively also comprises a plurality of tongues 21 with five tongues that are adapted to engage with a plurality of grooves 22 with five grooves provided in the at least one braiding segment 11a upon mounting of the right segment 11c to the at least one braiding segment 11a. However, for simplicity and clarity of the drawing the individual tongues and grooves of the plurality of tongues 21 and the plurality of grooves 22 are not separately labeled.

It should be noted that the at least one braiding segment 11a is shown with the plurality of grooves 20, 22, while the left and right segments 11b, 11c are respectively provided with the plurality of tongues 19, 21. However, in an alternative realization the at least one braiding segment 11a may instead be provided with the plurality of tongues 19, 21, while the left and right segments 11b, 11c may respectively be provided with the plurality of grooves 20, 22.

Illustratively, the left segment 11b further comprises a plurality of recesses 23. By way of example, four recesses 23a, 23b, 23c, 23d form the plurality of recesses 23. The recesses 23a, 23b, 23c, 23d are preferably at least approximately C-shaped.

Similarly, the at least one braiding segment 11a comprises a plurality of recesses 24. By way of example, four recesses 24a, 24b, 24c, 24d form the plurality of recesses 24. The recesses 24a, 24b, 24c, 24d are also preferably at least approximately C-shaped and represent the eyelets 15a, 15b, 15c, 15d in unclosed state.

More particularly, the recesses 24a, 24b, 24c, 24d are provided for accommodation of associated pairs of strands 14a, 14b, 14c, 14d of the plurality of strands 14 of the braided rope of FIG. 2, after insertion of the at least one braiding segment 11a into the plurality of strands 14 and braiding of the plurality of strands 14 around the at least one braiding segment 11a, as described above at FIG. 2. According to the example of FIG. 2, the pair of strands 14a would be accommodated in the recess 24c, the pair of strands 14b in the recess 24a, the pair of strands 14c in the recess 24d, and the pair of strands 14d in the recess 24b.

Upon mounting of the left segment 11b to the at least one braiding segment 11a, the recesses 23a, 23b, 23c, 23d and the recesses 24a, 24b, 24c, 24d form respectively together the eyelets 15a, 15b, 15c, 15d in a closed state according to FIG. 2 and FIG. 3. Due to the approximate C-shaped geometry of the recesses 23a, 23b, 23c, 23d and the recesses 24a, 24b, 24c, 24d, the eyelets 15a, 15b, 15c, 15d would have an at least approximately oval shape, as shown in FIG. 3.

It should be noted that the right segment 11c illustratively likewise comprises a plurality of recesses that is similar to the plurality of recesses 23 and that forms together with a further plurality of recesses of the at least one braiding segment 11a, which is similar to the plurality of recesses 24, the eyelets 15e, 15f, 15g, 15h. However, this further plurality of recesses of the at least one braiding segment 11a as well as the plurality of recesses of the right segment 11c is not labelled, for simplicity and clarity of the drawing.

As described above, the left and right segments 11b, 11c are preferably rigidly attached to the at least one braiding segment 11a. Therefore, a plurality of through-holes 25 is provided, which entirely traverse the at least one braiding segment 11a, and which preferably either completely traverse in addition the left segment 11b or the right segment 11c.

By way of example, five through-holes 25a, 25b, 25c, 25d, 25e form the plurality of through-holes 25 and entirely traverse the at least one braiding segment 11a. Furthermore, the three through-holes 25a, 25b, 25c illustratively entirely traverse the left segment 11b and merely form blind bore sections in the right segment 11c, and the two through-holes 25d, 25e illustratively entirely traverse the right segment 11c and merely form blind bore sections in the left segment 11b. The through-holes 25a, 25b, 25c, 25d, 25e may at least partly be embodied as threaded holes, preferably at least the blind bore sections.

Figure 5:
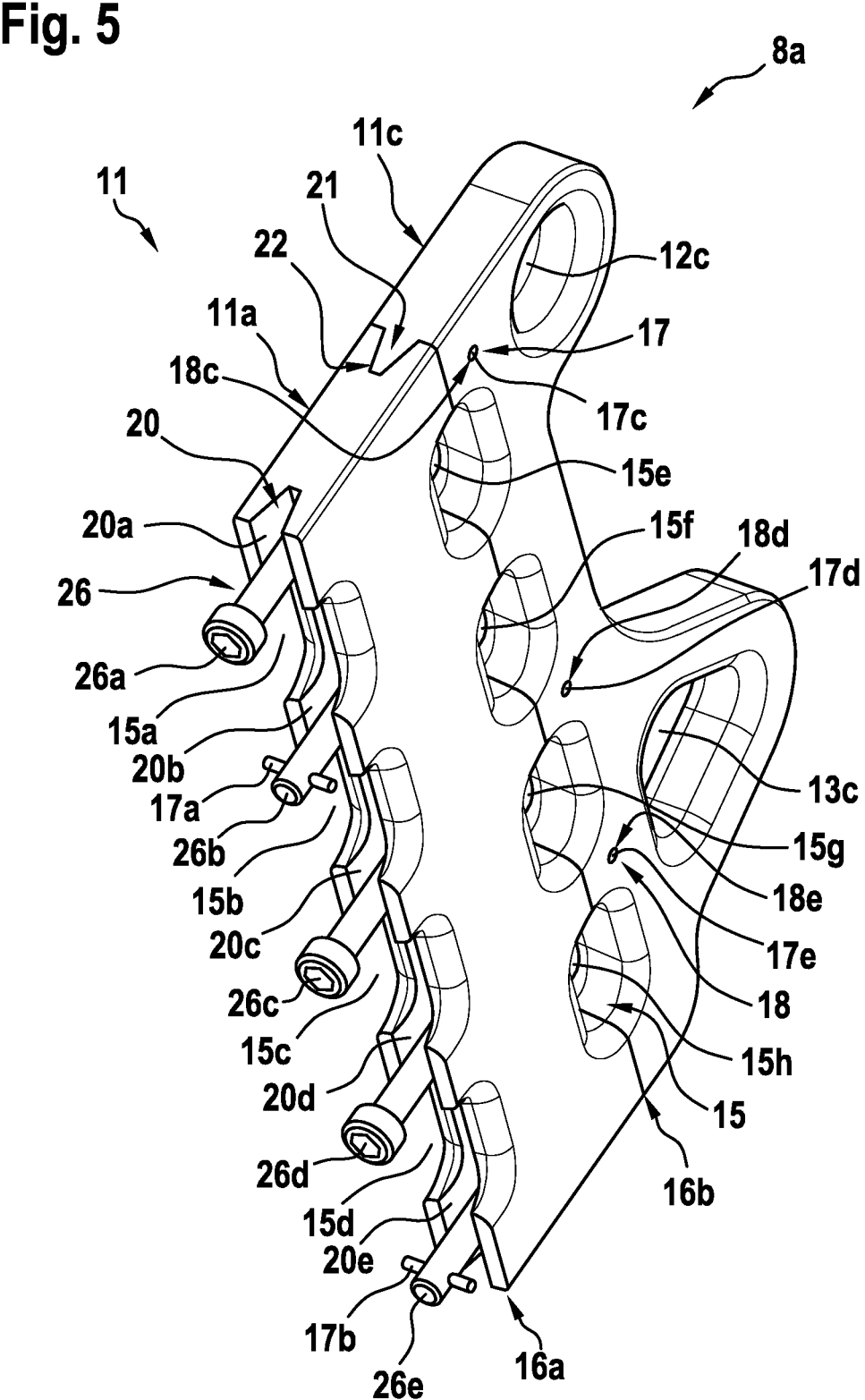
FIG. 5 shows a perspective view of the braiding segment and the second lateral fixation segment of FIG. 3 and FIG. 4.

FIG. 5 shows the modular attachment device 8a of FIG. 2 to FIG. 4, which is illustratively embodied as the rig plate 11 of FIG. 2 to FIG. 4. By way of example, the rig plate 11 comprises the at least one braiding segment 11a and the right segment 11c, which together form the eyelets 15e, 15f, 15g, 15h of the plurality of eyelets 15. The right segment 11c comprises the securing member accommodations 18c, 18d, 18e of the plurality of securing member accommodations 18, which accommodate the securing members 17c, 17d, 17e of the plurality of securing members 17 according to FIG. 3. Furthermore, the right segment 11c is mounted to the at least one braiding segment 11a at the right interface 16b by means of a tongue and groove joint with the plurality of tongues 21 and the plurality of grooves 22 according to FIG. 4. However, in contrast to FIG. 2 and FIG. 3 illustration of the left segment 11b that is mountable to the at least one braiding segment 11a at the left interface 16a by means of a tongue and groove joint with the plurality of tongues (19 in FIG. 4) and the plurality of grooves 20 according to FIG. 4 is omitted to further illustrate securing of the left and right segments 11b, 11c at the at least one braiding segment 11a.

More specifically, the left segment 11b is adapted to be fixedly mounted to the at least one braiding segment 11a at the left interface 16a via associated fixation means 26a, 26c, 26d. The right segment 11c, in turn, is adapted to be fixedly mounted to the at least one braiding segment 11a at the left interface 16b via associated fixation means 26b, 26e. The fixation means 26a, 26b, 26c, 26d, 26e illustratively form a plurality of fixation means 26 and may be embodied as screws, in particular self-locking screws.

By way of example, the fixation means 26b, 26e may be introduced through the right segment 11c and the at least one braiding segment 11a up to the left segment 11b. Thereby, the fixation means 26b, 26e would be accommodated in, i.e., screwed into, the through-holes 25d, 25e according to FIG. 4, i.e., their blind bore sections. The fixation means 26b, 26e may then be secured in the left segment 11b by means of the securing members 17a, 17b of FIG. 3. By way of example, the securing members 17a, 17b, which would be accommodated in the securing member accommodations 18a, 18b of the left segment 11b according to FIG. 3, may be embodied as grub screws.

Similarly, the fixation means 26a, 26c, 26d may be introduced through the left segment 11b and the at least one braiding segment 11a up to the right segment 11c. Thereby, the fixation means 26a, 26c, 26d would be accommodated in, i.e., screwed into, the through-holes 25a, 25b, 25c according to FIG. 4, i.e., their blind bore sections. The fixation means 26a, 26c, 26d may then be secured in the right segment 11c by means of the securing members 17c, 17d, 17e of FIG. 3. By way of example, the securing members 17c, 17d, 17e are accommodated in the securing member accommodations 18c, 18d, 18e of the right segment 11c and may also be embodied as grub screws.

Figure 6:
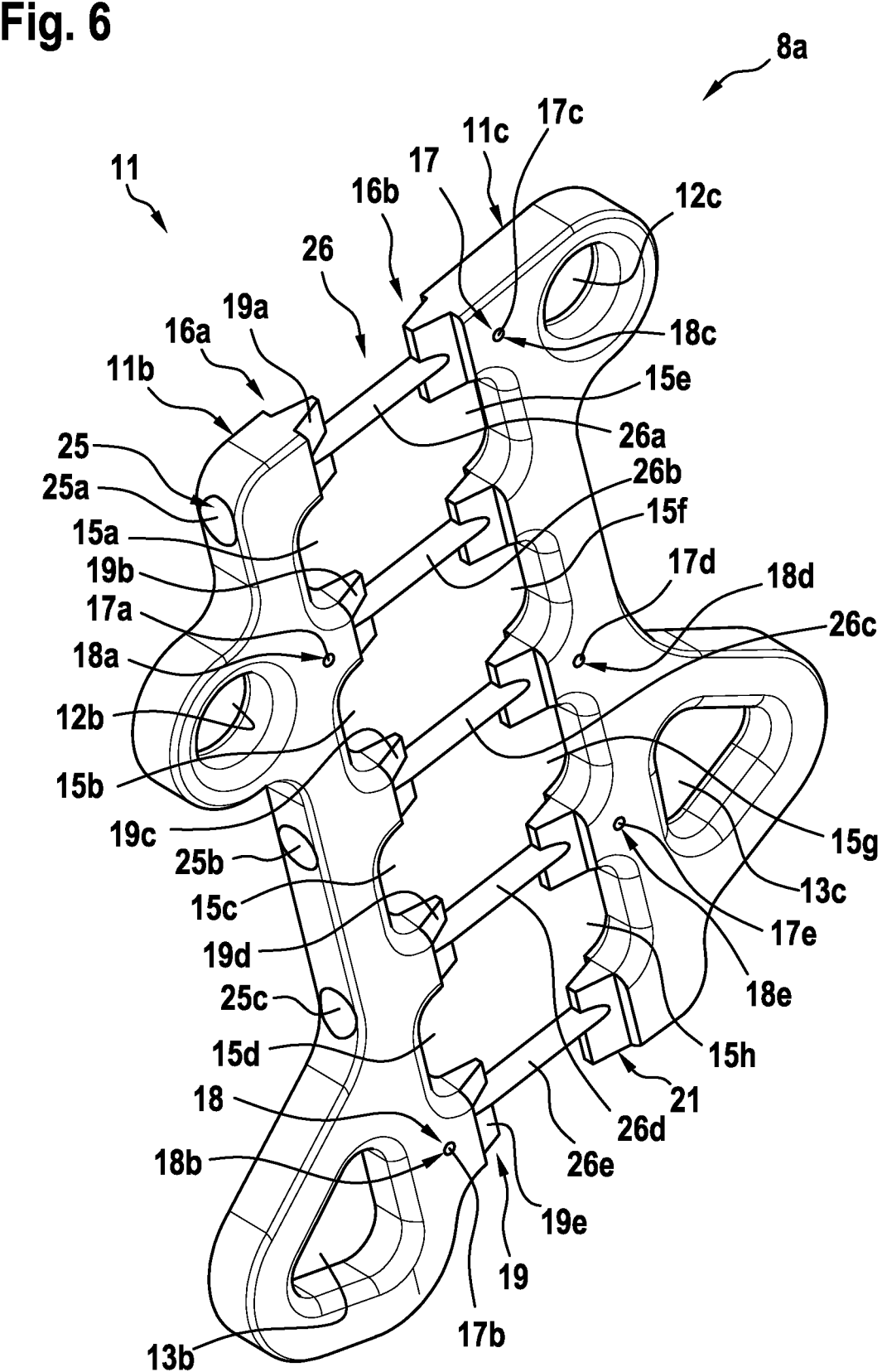
FIG. 6 shows a perspective view of the first and second lateral fixation segments of FIG. 3 and FIG. 4.

FIG. 6 shows the modular attachment device 8a of FIG. 2 to FIG. 5, which is illustratively embodied as the rig plate 11 of FIG. 2 to FIG. 5. By way of example, the rig plate 11 comprises the left and right segments 11b, 11c, which are rigidly attached to each other by means of the fixation means 26a, 26b, 26c, 26d, 26e of the plurality of fixation means 26, which are respectively secured in the left or right segment 11b, 11c by means of the securing members 17a, 17b, 17c, 17d, 17e of the plurality of securing members 17.

However, in contrast to FIG. 2 to FIG. 5 illustration of the at least one braiding segment 11a is omitted. Thus, FIG. 6 clarifies an illustrative realization, wherein the left and right segments 11b, 11c are fixedly mounted to each other by means of the fixation means 26a, 26b, 26c, 26d, 26e, while the at least one braiding segment 11a is merely hold in place between the left and right segments 11b, 11c on the fixation means 26a, 26b, 26c, 26d, 26e and by means of a form-lock or form-fit connection at the left and right interfaces 16a, 16b according to FIG. 4.

REFERENCE LIST 1 rotary wing aircraft
1a main rotor
2 fuselage
2a tail boom
2b cabin
2c bottom shell
3 counter-torque device
4 fin 5 rope attachment
6 Special Patrol Insertion/Extraction rig
7 braided rope
7a rope interface
8 plurality of attachment devices
8a attachment device
8b attachment device front side
9 persons
10 cargo
11 rig plate
11a center braiding segment
11b, 11c lateral fixation segments
12b, 12c anchor points
13b, 13c anchor points
14 strands
14a, 14b, 14c, 14d pairs of strands
15 strand eyelets
15a, 15b, 15c, 15d, 15e, 15f, 15g, 15h strand eyelet
16a, 16b lateral attachment interfaces
17 securing members
17a, 17b, 17c, 17d, 17e securing member
18 securing members accommodations
18a, 18b, 18c, 18d, 18e securing member accommodation
19 plurality of tongues
19a, 19b, 19c, 19d, 19e tongue
20 plurality of grooves
20a, 20b, 20c, 20d, 20e groove
21 plurality of tongues
22 plurality of grooves
23 plurality of C-shaped recesses
23a, 23b, 23c, 23d C-shaped recess
24 plurality of C-shaped recesses
24a, 24b, 24c, 24d C-shaped recess
25 plurality of through-holes
25a, 25b, 25c through-holes
26 plurality of fixation means
26a, 26b, 26c, 26d, 26e fixation means

What is claimed is:

1. A modular attachment device for insertion into a plurality of strands of a braided rope, comprising:
at least one braiding segment that is braidable into the plurality of strands;
at least one first lateral fixation segment that is mountable to the at least one braiding segment at a first lateral attachment interface; and
at least one second lateral fixation segment that is mountable to the at least one braiding segment at a second lateral attachment interface,
wherein at least one of the first and second lateral fixation segments comprises at least one anchor point for attachment of an external component, and wherein the first and second lateral fixation segments are mountable to the at least one braiding segment for securing the plurality of strands on the at least one braiding segment; and wherein at least one of the first and second lateral attachment interfaces is embodied as a tongue and groove joint.

2. The modular attachment device of claim 1, wherein the at least one braiding segment comprises a plurality of recesses for accommodation of associated pairs of strands of the plurality of strands.

3. The modular attachment device of claim 2, wherein the recesses of the plurality of recesses are at least approximately C-shaped.

4. The modular attachment device of claim 2, wherein the at least one first lateral fixation segment and the at least one second lateral fixation segment comprises a plurality of recesses that are configured to form with the plurality of recesses of the at least one braiding segment a plurality of strand eyelets, after mounting of the at least one first lateral fixation segment and the at least one second lateral fixation segment to the at least one braiding segment.

5. The modular attachment device of claim 4, wherein the recesses of the plurality of recesses of the at least one first lateral fixation segment and the at least one second lateral fixation segment are at least approximately C-shaped.

6. The modular attachment device of claim 1, wherein the at least one braiding segment comprises at least one groove, and wherein at least one of the first and second lateral fixation segments comprises at least one tongue that is adapted to engage with the at least one groove upon mounting of the at least one of the first and second lateral fixation segments to the at least one braiding segment.

7. The modular attachment device of claim 1, wherein at least one of the first and second lateral fixation segments comprises at least one groove, and wherein the at least one braiding segment comprises at least one tongue that is adapted to engage with the at least one groove upon mounting of the at least one of the first and second lateral fixation segments to the at least one braiding segment.

8. The modular attachment device of claim 1, wherein the at least one first lateral fixation segment is adapted to be fixedly mounted to the at least one braiding segment at the first lateral attachment interface via associated fixation means.

9. The modular attachment device of claim 1, wherein the at least one second lateral fixation segment is adapted to be fixedly mounted to the at least one braiding segment at the second lateral attachment interface via associated fixation means.

10. The modular attachment device of claim 8, wherein the associated fixation means are screws, in particular self-locking screws.

11. The modular attachment device of claim 8, wherein at least one of the first and second lateral fixation segments and/or the at least one braiding segment comprises at least one securing member accommodation for accommodating a securing member that is adapted to secure one of the associated fixation means after mounting of the at least one first lateral fixation segment and the at least one second lateral fixation segment to the at least one braiding segment.

12. The modular attachment device of claim 11, wherein the securing member is a grub screw.

13. The modular attachment device of claim 1, which is embodied as a rig plate, wherein at least one of the first and second lateral fixation segments and the at least one braiding segment comprises metal.

14. A Special Patrol Insertion/Extraction rig with a braided rope and at least one modular attachment device for insertion into a plurality of strands of the braided rope, wherein the at least one modular attachment device comprises:
at least one braiding segment that is braidable into the plurality of strands;
at least one first lateral fixation segment that is mountable to the at least one braiding segment at a first lateral attachment interface; and
at least one second lateral fixation segment that is mountable to the at least one braiding segment at a second lateral attachment interface,
wherein at least one of the first and second lateral fixation comprises a least one anchor point for attachment of an external component, and wherein the first and second lateral fixation segments are mountable to the at least one braiding segment for securing the plurality of strands on the at least one braiding segment; and wherein at least one of the first and second lateral attachment interfaces is embodied as a tongue and groove joint.

15. The Special Patrol Insertion/Extraction rig of claim 14, wherein the at least one braiding segment comprises a plurality of recesses for accommodation of associated pairs of strands of the plurality of strands.

16. The modular attachment device of claim 2, wherein the at least one first lateral fixation segment and the at least one second lateral fixation segment comprise a plurality of recesses that are configured to form with the plurality of recesses of the at least one braiding segment a plurality of strand eyelets, after mounting of the at least one first lateral fixation segment and the at least one second lateral fixation segment to the at least one braiding segment.

17. The modular attachment device of claim 16, wherein the recesses of the plurality of recesses of the at least one first lateral fixation segment and the at least one second lateral fixation segment are at least approximately C-shaped.

18. The modular attachment device of claim 8, wherein at least one of the first and second lateral fixation segments and the at least one braiding segment comprises at least one securing member accommodation for accommodating a securing member that is adapted to secure one of the associated fixation means after mounting of the at least one first lateral fixation segment and the at least one second lateral fixation segment to the at least one braiding segment.

19. The modular attachment device of claim 18, wherein the securing member is a grub screw.

20. The modular attachment device of claim 1, which is embodied as a rig plate, wherein at least one of the first and second lateral fixation segments and the at least one braiding segment comprise metal.

* * * * *